United States Patent [19]

Breining

[11] 4,357,506

[45] Nov. 2, 1982

[54] SWAG KIT FOR CEILING MOUNTED FANS
[75] Inventor: Frank E. Breining, Jackson, Mich.
[73] Assignee: Airmaster Fan Company, Jackson, Mich.
[21] Appl. No.: 248,431
[22] Filed: Mar. 27, 1981
[51] Int. Cl.³ .............................................. H01H 9/00
[52] U.S. Cl. ................................... 200/52 R; 174/54; 307/112; 416/5
[58] Field of Search ......................... 200/52, 298, 299; 206/223; 362/147, 253; 98/40 D, 40 DL; 174/54, 61, 62, 63, 64; 416/5; 307/112

[56] References Cited
U.S. PATENT DOCUMENTS 1,222,837  4/1917  Winslow et al. ......................... 416/5
1,732,171  10/1929  Simmons ......................... 98/40 DL Primary Examiner—A. T. Grimley
Assistant Examiner—Morris Ginsburg
Attorney, Agent, or Firm—Beaman & Beaman

[57] ABSTRACT

The invention pertains to a swag kit for ceiling mounted fans wherein the kit includes a flexible electrical conductor supported within a chain, the upper region of the chain being connected to a ceiling plate while the lower region of the conductor connects to a switch box containing a switch for the fan, and may also include a light switch. A line cord is connected to a switch within the switch box, and the ceiling plate functions to electrically isolate the fan connections from the ceiling in compliance with code regulations. Conductor strain relief means are provided at both the ceiling plate and switch box, and a chain receiving hook is homogeneously defined upon the ceiling plate to support the chain without tensioning the conductor.

8 Claims, 4 Drawing Figures

SWAG KIT FOR CEILING MOUNTED FANS

BACKGROUND OF THE INVENTION

Interest in energy saving devices has popularized the installation of ceiling mounted fans wherein fans of relatively large diameter rotate about a vertical axis to circulate the air within a dwelling space. Such fans have the advantage, during heating, of removing the warmer air from adjacent the ceiling for distribution throughout the room, and under cooling conditions, the movement of air, although gradual, produces a cooling effect. As such fans normally operate at relatively slow speeds, and are powered by fractional horse power electric motors, comfort is increased with low energy expenditure.

As many ceiling fan installations do not utilize permanent wiring, exterior wiring is often employed and an aesthetically attractive exterior wiring of a ceiling mounted fan may be achieved by the use of a swag kit.

Swag kits permit the fan to be located upon the ceiling at the desired location with little regard to the wiring location within the room. The swag kit normally consists of a flexible decorative chain or cord conductor support attached at one end to the fan, or fan connection box, and a portion of the conductor support is normally suspended from the ceiling by hooks whereby the conductor support forms pleasing catenary arcs across the ceiling to a wall. The conductor and support then extends downward along the wall, and the lower end of the conductor extends beyond the conductor support for plugging into a wall outlet.

In the aforementioned swag type installation fan control is usually achieved by locating a switch within the fan itself and a pull cord depending from the fan permits the operator to control the fan by pulling on the cord. A variable speed switch may be used whereby the number of pulls determines the rate of fan rotation.

It is also known to employ a switch adjacent the lower end of the swag conductor and support. However, in such installations the installer must design his own switch installation to accomodate the particular situation.

Previously, swag kits for use with ceiling mounted fans were not complete in the sense that switch box and switch means are not provided with the kit which permits universal use, and complete installation requires an ingenuity and skill beyond the ordinary.

It is an object of the invention to provide a swag kit for use with ceiling mounted fans wherein the swag kit utilizes a ceiling mounted plate at the upper end of the conductor support, and a surface mounted switch box is located at the lower region of the conductor to permit ready control of fan operation.

A further object of the invention is to provide a swag kit for ceiling mounted fans wherein electrical conductor strain relief means are located at each end of the conductor, the upper end being associated with a ceiling plate, and the lower end being associated with a switch box, whereby code restrictions may be met and the likelihood of conductor wear and shorting is reduced.

Yet a further object of the invention is to provide a swag kit for ceiling mounted fans wherein a ceiling plate is employed having a hook for receiving the conductor supporting chain, and a spacer is utilized intermediate the ceiling plate and the ceiling to provide access for the hook and permit the conductor to be inserted through the plate for strain relief purposes.

Another object of the invention is to provide a swag kit for ceiling mounted fans wherein the electrical conductor may include two circuits, and the swag kit switch box includes a pair of switches to permit switch box control of both the fan and a light associated therewith.

An additional object of the invention is to provide a swag kit for ceiling mounted fans employing a surface mounted switch box capable of accepting fan control switches of either the choke or solid state type.

A further object of the invention is to provide a swag kit for ceiling mounted fans which utilizes a metallic ceiling plate, which, when used in conjunction with a fan mounted shroud, defines a metal receptacle for receiving the wiring connections in order to comply with code regulations.

Another object of the invention is to provide a swag kit for ceiling mounted fans employing a ceiling plate having an integrally defined hook mounted thereon for supporting the conductor chain, and wherein a spacer is disposed between the ceiling plate and the ceiling, such ceiling plate including alternate mounting means for the spacer whereby the spacer may be oriented in that manner to locate the chain hook as desired.

The swag kit in accord with the invention consists of a linked chain having an electrical conductor woven therethrough, the conductor preferably having two conducting circuits whereby both the fan, and a fan light, may be controlled. The lower end of the conductor is connected to a surface mounted switch box in a strain relief manner, and the switch box receives a switch which may be either of the choke or solid state type to regulate the fan speed. An electrical supply line cord is also associated with the switch box for supplying electrical power to the fan through the switch.

At its upper end the conductor, and chain, are connected to a metal ceiling plate. The ceiling plate includes a homogeneous hook lanced from the material thereof which extends in an upward direction from the plane of the ceiling plate and receives the link of the upper end of the chain. An insulated grommet defined in the ceiling plate receives the conductor as inserted downwardly through the grommet, and strain relief is achieved between the ceiling plate and conductor.

A spacer bar is mounted upon the upper side of the ceiling plate for direct engagement with the ceiling whereby the installation of screws, or other fasteners, through the ceiling plate and spacer affix the ceiling plate to the ceiling in spaced relationship thereto as determined by the vertical dimension of the spacer. This spacing provides clearance for the conductor to extend through the ceiling plate, and as the extension of the free end of the hook above the ceiling plate substantially corresponds to the vertical dimension of the spacer the ceiling itself will prevent the chain link from being removed from the ceiling plate hook.

The conductors located below the ceiling plate are attached to the fan, which is supported from a hook depending from the spacer bar and ceiling plate, and a fan mounted shroud is normally utilized to enclose the upper end of the fan and the wiring located immediately adjacent the ceiling plate. In this manner, the ceiling plate and shroud form a metal receptacle for housing the wiring components at the fan in compliance with state codes.

The spacer bar for the ceiling plate is in the form of a U shaped channel, and includes holes which align with mounting screw receiving holes defined in the ceiling plate. Several sets of such holes are defined in the ceiling plate oriented at 90° with respect to each other about the plate center, and the holes permit the ceiling plate and spacer to be angularly oriented in at least two selective relationships in order to orient the ceiling plate hook to the length of the spacer to accomodate the particular installation.

A heavy duty hook also extends through the ceiling plate into the channel of the spacer bar for supporting the fan and the spacer bar functions in the dual capacity of providing a rigid support for the fan and maintaining clearance between the ceiling and ceiling plate.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
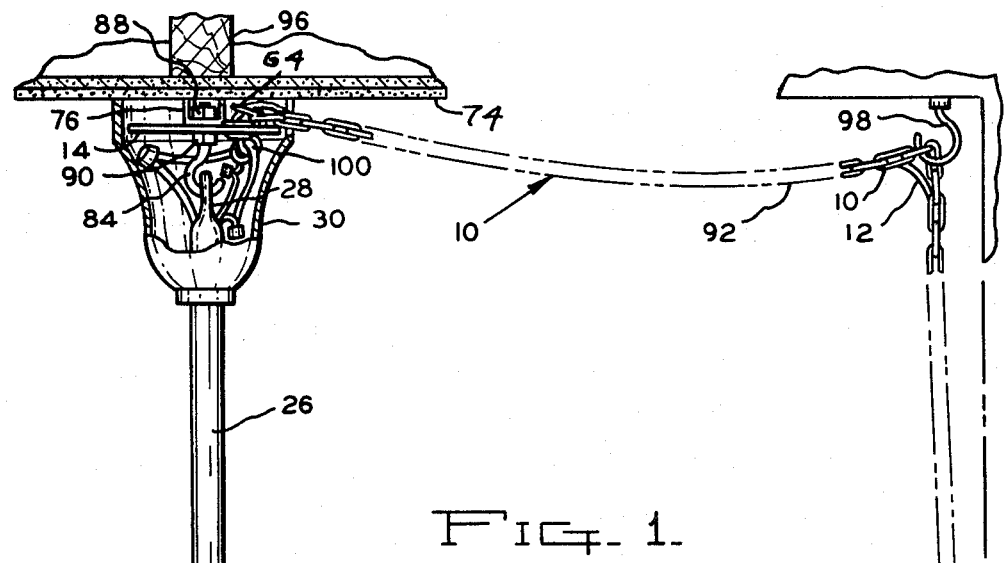
FIG. 1 is an elevational view of a typical ceiling fan installation using the swag kit of the invention.

A swag kit in accord with the invention is illustrated in its entirety in FIG. 1. Basically, the swag kit includes a flexible light gauge metal link chain 10 through which an electrical conductor 12 is threaded whereby the conductor will be maintained in close proximity to the chain and generally conform to the chain configuration as the chain comprises a support for the conductor. At its upper region the chain and conductor are associated with a ceiling plate 14, and at its lower region the chain and conductor are associated with the surface mounted switch box 16 which receives switch plate 18, and electrical supply line cord 20 plugs into the conventional wall receptacle 22.

The aforementioned components, including other accessories such as the hook for supporting the chain and conductor, mounting screws for attaching the ceiling plate to the ceiling, and the ceiling plate mounted hook for supporting the fan all constitute a portion of the swag kit of the invention as sold as a package.

The ceiling mounted fan generally represented at 24, includes a supporting neck 26 having a hook eye 28 defined thereon at its upper end, and a metal shroud 30 is located upon the shank for encompassing the ceiling plate, as later described. The fan includes a plurality of blades 32 which are rotated by the fan motor 34, and in the disclosed embodiment the fan includes a lamp 36 for room illumination purposes. The fan construction, itself, does not constitute a part of the instant invention, and a swag kit may be used with all types of conventional ceiling mounted fans with or without illumination.

The switch box 16 is preferably molded of a synthetic plastic electrically insulative material and is basically of a rectangular configuration having a rectangular cavity 38 defined therein in which are located homogeneous posts 40 for receiving the screws for mounting the switch plate 18 thereon. At its rear wall the switch box includes openings 42 for receiving screw fasteners for attaching the switch box to the wall 44, and the switch box includes an upper "knock out" opening 46 for receiving the lower end of the conductor 12. The conductor 12 extends through the opening 46, and a knot 48 is tied in the conductor to prevent the conductor from being withdrawn from the opening, and thereby produce strain relief for the conductor lower end.

Switch plate 18 attaches to the switch box 16 by screws, not shown, extending through switch plate holes 50 and threaded into the switch box posts 40. The switch plate includes a switch 52 mounted on the inside thereof as controlled by a knob 54, and the knob is setable at various positions to control the speed of the fan. Normally, with ceiling mounted fans, the speed control switch 52 is of the choke or transformer type, or comprises a solid state control.

Figures 2, 3, 4:
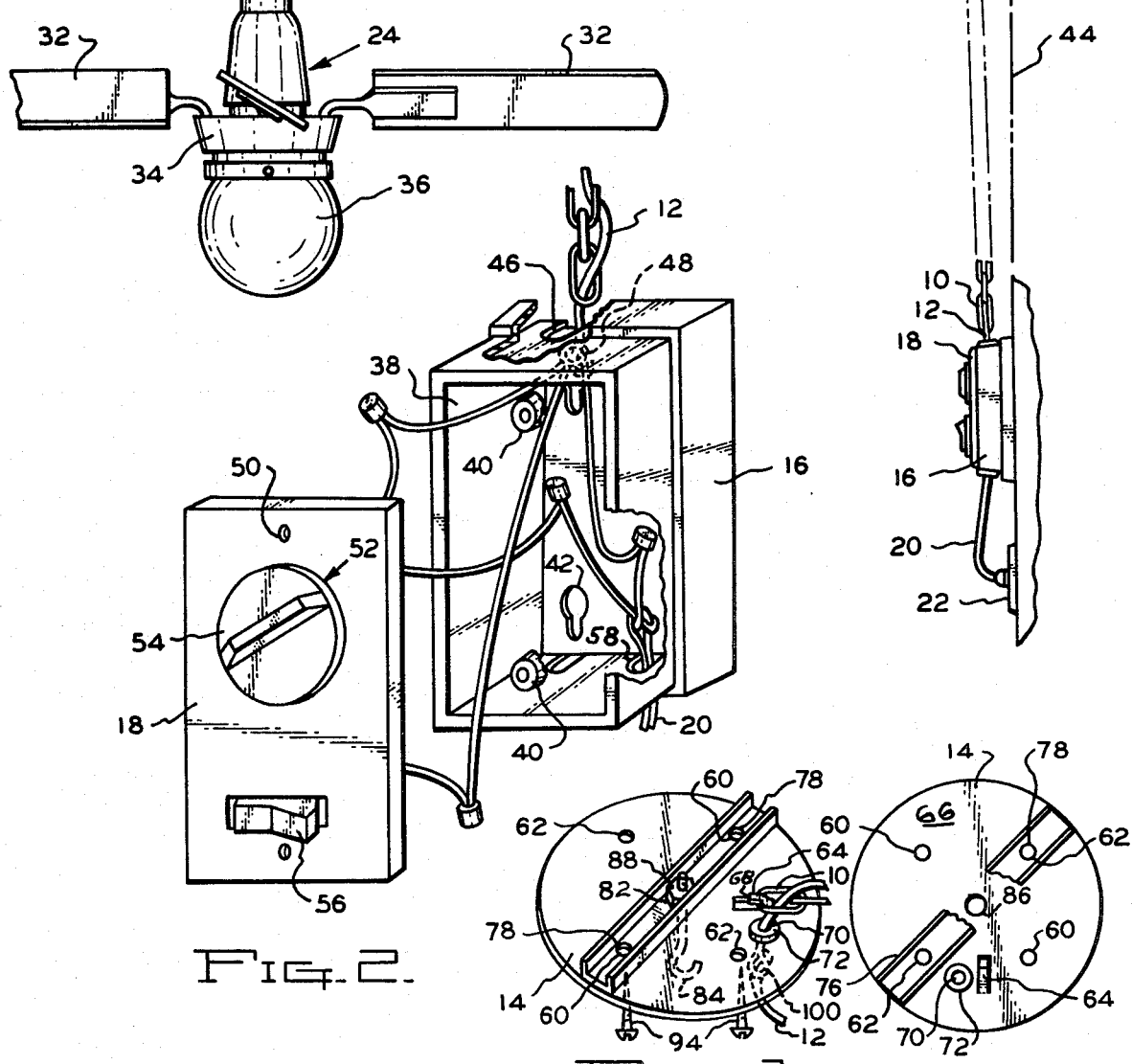
FIG. 2 is an enlarged, perspective, detail view of the switch box and switch plate used in conjunction with the swag kit.
FIG. 3 is a perspective, detail view of the ceiling plate structure.
FIG. 4 is a plan view of the ceiling plate illustrating the spacer bar related to the ceiling plate in a manner differing from that shown in FIG. 3.

As many ceiling mounted fans include illumination means, a light switch 56 is also mounted in the switch plate 18, and the light switch and fan switch are connected to the line cord 20 by wire nuts in a manner as will be apparent from FIG. 2. The line cord 20 extends through a knock out opening 58 in the lower portion of the switch box, and may be knotted for strain relief purposes, and the line cord plugs into the wall receptacle 22 as apparent in FIG. 1.

The ceiling plate 14 is formed of sheet metal, and is generally of a planar configuration having a circular periphery. The ceiling plate includes two sets of mounting holes 60 and 62, the pair of holes of a set being in diametrically opposed relationship with respect to the plate center hole 86, and the sets are disposed at 90° with respect to each other. The ceiling plate also includes a hook 64 which is lanced from the plate material and extends in an upward direction above the plate upper surface 66, the hook "opening" at its free end 68 in a direction toward the center of the plate. Additionally, the ceiling plate includes an opening 70 which receives a synthetic plastic grommet 72 through which the upper end of the conductor 12 is inserted.

When installed, the ceiling plate is to be spaced from the ceiling 74, and this spacing is achieved by a spacer bar 76 comprising a channel shaped member having a length substantially equal to the diameter of the ceiling plate. Holes 78 are defined in the base of the spacer bar, and a central hole 82 is also defined therein. The holes 78 are spaced corresponding to the hole sets 60 and 62, and regardless of either angular relationship of the spacer bar 76 to the ceiling plate, and hook 64, holes 78 will align with holes 60 or 62 to receive screws inserted from the underside of the ceiling plate whereby the screws permit the ceiling plate 14 to be firmly attached to the ceiling 74 at a ceiling joist.

A fan supporting hook 84, FIG. 1, inserts through the central opening 86 of the ceiling plate, and the central opening 82 of the spacer bar, and employs a nut 88 at its upper end and a nut 90 below the ceiling plate whereby the hook is firmly attached to the spacer bar 76 and is supported thereby.

The eye 28 of the fan neck 26 is supported by the hook 84, and the sheet metal fan shroud 30 encompasses the upper end of the neck, and the ceiling plate and associated structure. The shroud will normally include a notch adjacent its upper edge to receive the chain 10 if a flush mounting of the shroud against the ceiling, as illustrated, is desired. By the use of wire nuts the circuits of the conductor 12 may be connected to the fan and light circuit within the shroud 30.

To install the swag kit of the invention the ceiling plate is prepared by assembling the hook 84 to the spacer bar 76 by use of the nuts 88 and 90. The grommet 72 should be inserted in hole 70 if it is not already so located, and the installer now aligns one of the sets of holes 60 or 62 with the holes 78 defined in the spacer bar. When making this alignment, the set of ceiling plate holes 60 or 62 which are to be used are those which will position the hook 64 in the direction most appropriate with respect to the direction that the horizontal portion 92 of the chain and conductor will extend. In FIG. 3 one directional orientation of the hook is shown, while in FIG. 4 the alternate hook orientation is illustrated.

Wood screws 94 extending through holes 60 or 62 and spacer bar holes 78 are screwed into the ceiling joist 96 at the desired location of fan installation, and tightening of the wood screws will firmly affix the ceiling plate 14 at the desired location in spaced relationship to the ceiling 74 as determined by the vertical dimension of the spacer bar.

The conductor 12 is laced through every third or fourth link of the chain 10 allowing ten or twelve inches of free wire at each end, and the chain supporting hook 98 is located in the ceiling 74 adjacent the wall 44 along which the vertical portion of the chain and conductor will extend. Several supporting hooks 98 may be utilized along the ceiling if the horizontal portion 92 is of such length to warrant additional support.

The link at the upper end of the chain 10 is placed over hook 64, and there may be some difficulty in achieving this as it is desirable that the free end 68 of the hook extend above the ceiling plate upper surface 66 a dimension substantially equal to the vertical dimension of the spacer bar 76 in order to minimize the likelihood of the chain end inadvertently becoming unhooked. By locating the free end of the hook adjacent the ceiling the ceiling constitutes a barrier to removal of the chain end from the hook. In many instances it is desirable to place the chain link on hook 64 before screws 94 are fully tightened.

The upper end of the conductor 12 is inserted above the ceiling plate and fed through the grommet 72 in a downward direction whereby the ends of the wire conductor will be located below the ceiling plate 14 for connection to the fan conductors. The conductor is knotted at 100 below grommet 72 to provide strain relief.

The switch box 16 is mounted upon the wall 44 by mounting screws, not shown, at a proximity to the receptacle 22 to permit connection thereto by the line cord 20. A knock out opening 46 in the switch box for receiving the lower end of the conductor 12 is opened, and the lower end of the conductor is fed through the knock out opening and the conductor is knotted at 48 to provide a strain relief against withdrawal of the conductor from the switch box. Likewise, the line cord 20 is inserted into a knock out opening 58 in the lower region of the switch box, and is knotted for strain relief purposes. The conductors of the line cord, conductor 12, and switch plate 18 are then interconnected by wire nuts, and the switch plate mounted upon the switch box.

The fan 24 is hooked upon hook 84 by eye 28, and the fan conductors are connected to the swag conductor 12 by wire nuts. After the fan and swag conductors are connected the shroud 30 is moved upwardly to confine the connectors between the shroud and the ceiling plate 14 and the installation has now been completed. Control of the fan 24 and light 36, are now accomplished at the switch box by switches 52 and 56, respectively, and selective control of the fan, or light, is readily achieved.

The disclosed arrangement provides strain relief for the swag conductor at both the ceiling plate and switch box. Further, the fact that the upper end of the chain supporting the swag conductor is hooked to the ceiling plate substantially removes the likelihood of the weight of the chain being imposed upon the conductor, and the possibility of short circuits because of swag conductor wear due to chain or swag movement is substantially reduced as compared with conventional apparatus for wiring ceiling fans. The swag kit of the invention can readily be installed by persons of average skill, and the fact that the electrical connections at the fan are confined within the shroud and the ceiling plate meets most code restrictions.

It is appreciated that various modifications to the inventive concepts may be apparent to those skilled in the art without departing from the spirit and scope of the invention.

I claim:

1. A swag kit for ceiling mounted fans comprising, in combination, a flexible electrical conductor having an upper fan related end region and a lower switch related end region, a surface mounted switch box having conductor lower end region support means defined therein fixedly receiving said conductor lower end region, a ceiling plate having conductor upper end region support means defined thereon fixedly receiving said conductor upper end region, said ceiling plate having an upper surface and a lower surface, spacer means defined upon said plate upper surface, mounting means defined on said plate for attaching said plate to a ceiling in spaced relation thereto as determined by said spacer means, fan support means depending from said plate, switch means mounted within said switch box electrically connected to said conductor lower end region, and an electric supply conductor connected to said switch means.

2. A swag kit for ceiling mounted fans in claim 1, a chain having a lower end disposed adjacent said switch box and an upper end connected to said ceiling plate, said flexible conductor being supported by said chain.

3. A swag kit for ceiling mounted fans as in claim 2, a hook defined on said ceiling plate, said chain upper end being hooked over said hook.

4. A swag kit for ceiling mounted fans as in claim 3, said hook being defined from the material of said ceiling plate as a lancing.

5. A swag kit for ceiling mounted fans as in claim 4, said hook having a free end, said hook free end being spaced from said plate upper surface a distance substantially equal to the maximum projection of said spacer means from said plate upper surface.

6. A swag kit for ceiling mounted fans as in claim 3, said mounting means comprising first and second sets of holes defined in said plate variably related to said hook for selectively receiving screw fasteners, and a third set of holes defined within said spacer means adapted to selectively align with said first or second set of holes whereby said screw fasteners selectively relate said spacer means relative to said hook.

7. A swag kit for ceiling mounted fans as in claim 1 wherein said flexible conductor comprises two circuits, one circuit comprising a fan control and the second circuit comprising a light control, said switch means including a fan control switch and a separate light control switch.

8. A swag kit for ceiling mounted fans as in claim 1 wherein said switch box is formed of a synthetic plastic dielectric material, said conductor lower end region support means comprising an opening defined in said switch box receiving the lower end region of said conductor.

* * * * *